Sept. 22, 1953 A. KLAMMT ET AL 2,652,806
MACHINE FOR APPLYING ADHESIVES IN THE BOTTOMS
OF THE GROOVES OF FLOORING STRIPS
Filed Dec. 28, 1948 3 Sheets-Sheet 1
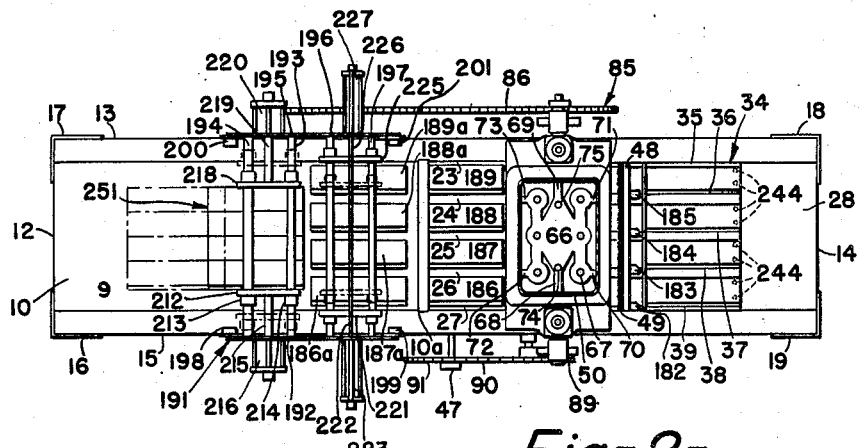
Fig-2-
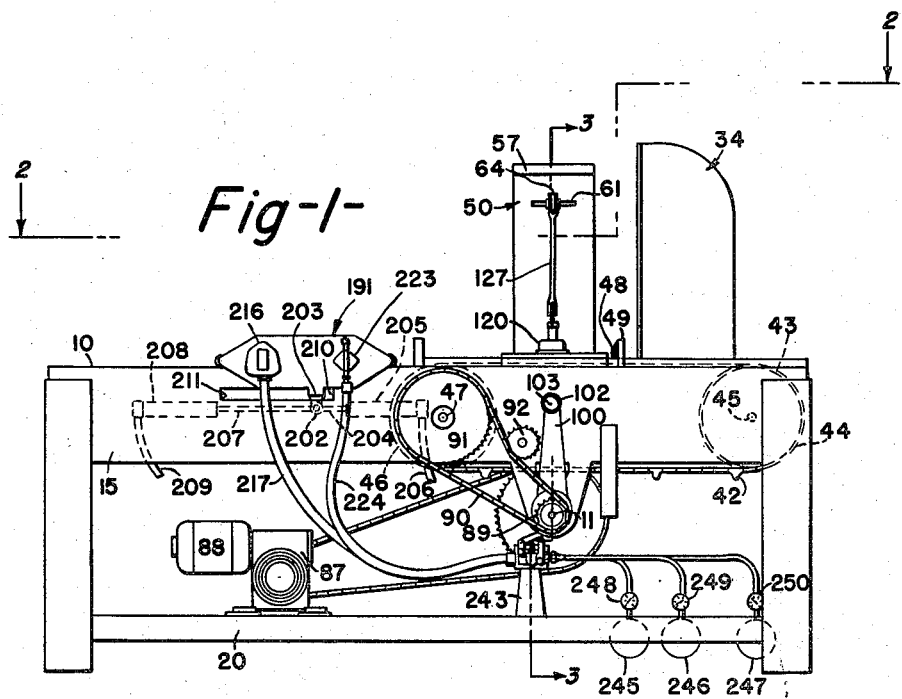
Fig-1-
INVENTORS
ARTHUR KLAMMT
GEORGE W. KRETZSCHMAR
BY
J. A. Grier
ATTORNEY

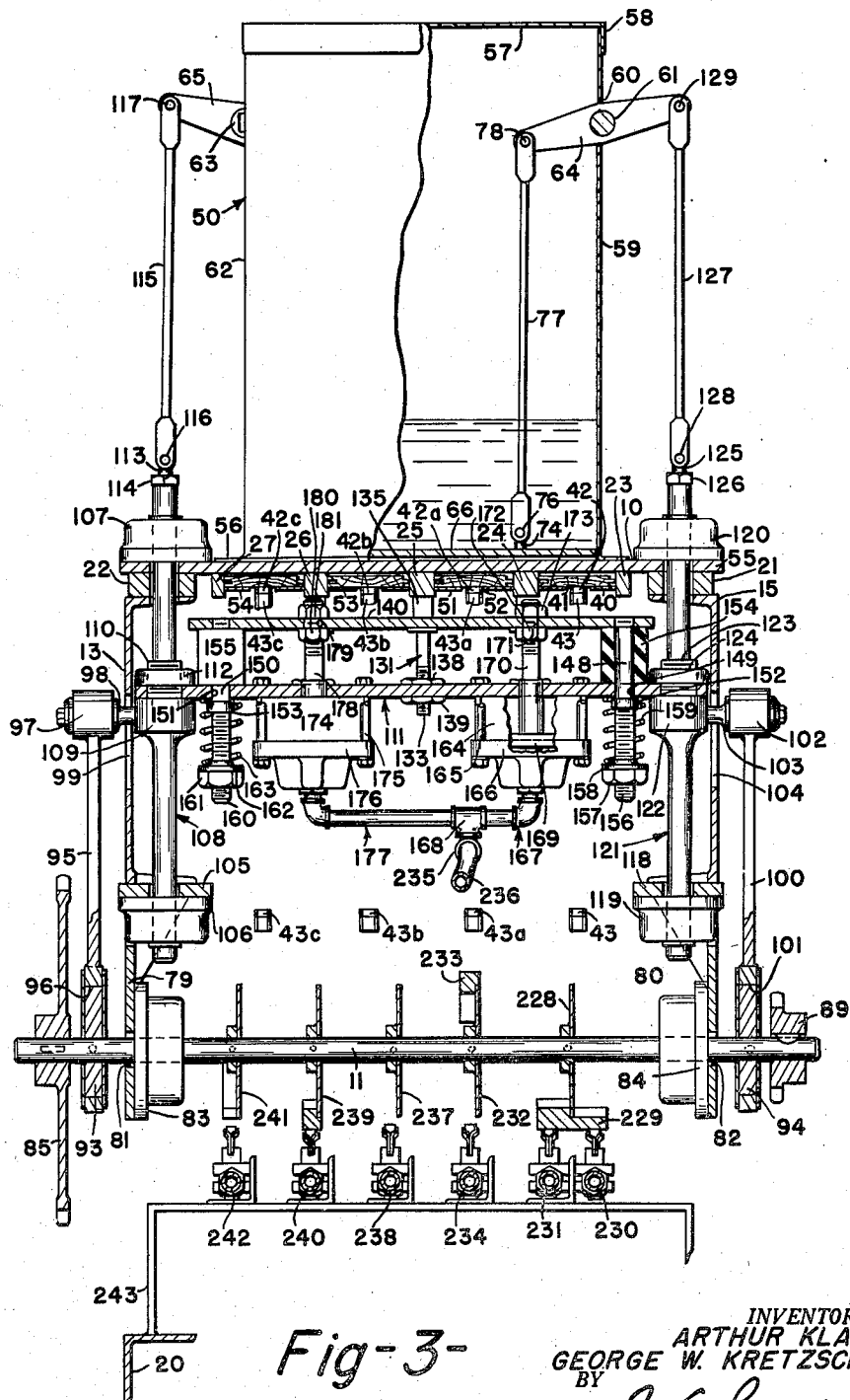
Fig-3-

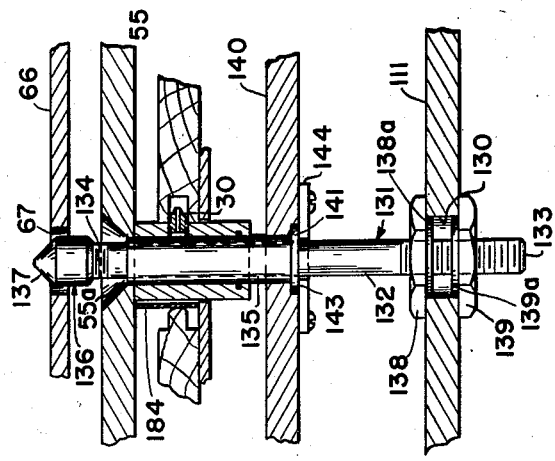
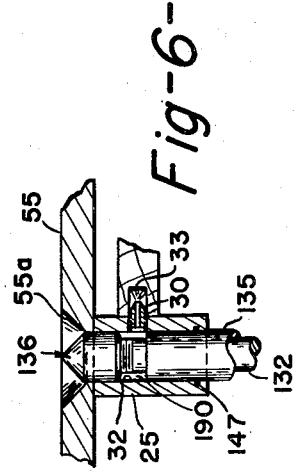
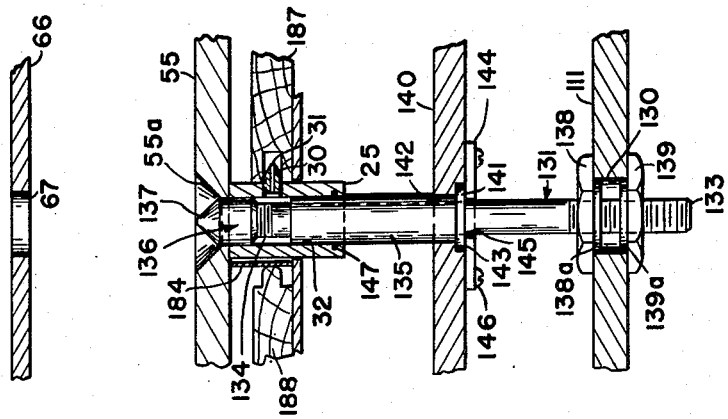

Patented Sept. 22, 1953

2,652,806

UNITED STATES PATENT OFFICE 2,652,806

MACHINE FOR APPLYING ADHESIVES IN THE BOTTOMS OF THE GROOVES OF FLOORING STRIPS

Arthur Klammt, Yonkers, N. Y., and George W. Kretzschmar, Garfield, N. J., assignors to W. M. Ritter Lumber Company, a corporation of West Virginia Application December 28, 1948, Serial No. 67,728

9 Claims. (Cl. 118—410)

This invention relates to improvements in machine for applying adhesives in the bottoms of the grooves of flooring strips and has for an object the provision of a machine for: feeding and advancing a plurality of flooring strips along spaced parallel paths, applying spaced spots of adhesive in the grooves of all of said strips except the end strip which has its groove facing outwardly, bringing said groups together under the urge of comparatively light pressure to give said spots a chance to spread between the tongues and grooves, and finally urging said strips together under slightly greater pressure, thereby forming a parquet flooring block of each group of strips. Parquet blocks formed in this manner are flexible due to the fact that the rubber spots act as hinges and this greatly facilitates the laying of the parquet blocks because they follow or conform to the contour of the surfaces upon which they are laid.

Another object of the invention is the provision in a machine for applying spaced spots of adhesive in the grooves of flooring strips, of an adhesive handling system in which the nozzles through which the adhesive is discharged, extend into the grooves, and in which means is provided for impulsing the adhesive so as to give a quick discharge and an immediate suction so as to withdraw the adhesive in the nozzles immediately after they have discharged, thereby preventing dribbling and consequently oozing of the adhesive on the surfaces of the flooring strips which would interfere with the finish which is finally applied to the surfaces of said blocks.

A further object of the invention is the provision in a machine of the character described of feeding means in which each strip is urged both laterally and downwardly while being moved forwardly in order to insure accurate alignment of the ends of the several strips which go to form each parquet block.

Yet another object of the invention is the provision, in a machine of the character described, of an adhesive tank in which the means for discharging the adhesive via nozzles directed toward the bottoms of the grooves in the flooring strips is comprised of compound mechanism, part of which acts upwardly through the bottom of said tank by pneumatic means, and part of which is within the tank and is reciprocated therein by a means different from said first means.

Another object of the invention is the provision, in a machine of the character described, of mechanical means for advancing the flooring strips from a feeding station, via a station where spots of adhesive are applied in the bottoms of the grooves therein, a station where the strips are assembled under comparatively moderate pressure, and a final station where the strips are subjected to substantially heavy pressure, said last stations being controlled by pneumatic means.

Yet another object of the invention is the provision, in a machine of the character described, of a plurality of pneumatically operated devices, and cam controlled valve means for controlling the supplying of a fluid medium under pressure thereto, said cam means having sectors adjustably carried thereon, thereby enabling the timing of said camming means to be set within predetermined limits.

Other objects and advantages of the invention will be apparent to those skilled in the art upon a study of this specification and the accompanying drawings.

Referring now to the drawings, which are merely given by way of example to illustrate the invention:

Figure 1 is a side elevation of my new and improved machine for grouping parquet flooring blocks;

Figure 2 is a plan view partly in section as seen along the lines 2—2 of Figure 1;

Figure 3 is a sectional elevation taken along the lines 3—3 of Figure 1;

Figure 4 is a sectional view showing the relation of one of the nozzles to the groove in one of the flooring strips, the nozzle plunger and the relation of the reciprocable plate within the adhesive tank;

Figure 5 is similar to Figure 4 except that the reciprocable plate has been moved to a point near the lower extremity of its movement and the plunger is moving downwardly prior to the delivery of the adhesive to the nozzle; and Figure 6 shows the plunger in the position for causing the adhesive to squirt against the bottom of the groove in the flooring strip.

Referring first to Figures 1, 2 and 3, the machine table has a plate 9 having an upper surface 10 on which the strips are brought together and along which the assembled parquet blocks are moved. The table has downwardly projecting sides in the form of channels 11, 12, 13, 14 and 15, and secured to these downwardly projecting sides in any suitable manner, for example, by welding are legs 16, 17, 18 and 19, which are generally L-shaped in cross section and which are joined near their lower ends by L-shaped channel members, one of which is shown at 20 in Figures 1 and 3.

The right end of the surface 10 terminates at the point 10a, as seen in Figure 2, and a series of parallel guide strips 23, 24, 25, 26 and 27 extend from the point 10a to a plate 28 on the feed end of the machine. These guide strips are substantially parallel to each other and are spaced apart from each other distances equal to the width of the flooring strips plus the thickness of a spring, which will presently be described, plus clearance. Each of these strips, with the exception of the strip 27, is provided with a series of holes, which might be termed small cylinder bores, within which special cylinder means, also to be presently described, reciprocates. In the embodiment shown in the drawings each of these guide strips carries two such cylinder bores which are spaced apart from each other equal to the wanted distance apart longitudinally of the spots of adhesive in the grooves of the flooring strips.

Mounted in the guides are nozzles, such as the nozzle 30 shown in Figures 4, 5 and 6, having a bore 31 which communicates with the cylinder bore shown in Figure 4 at 32, so that each of the two nozzles carried in each of the guides is positioned to squirt a spot of adhesive, such as the spot 33 in the bottom of the groove of the flooring strip (see Figure 5). A feed magazine generally designated by the numeral 34 has a plurality of columns formed therein between plates 35, 36, 37, 38 and 39.

Referring now to Figure 3, a slotted plate 40 is provided between the guides 23 and 24, the upper surface of which is substantially level with the upper surface 10 of the plate 9. The slot 41 therein forms a passage along which the engaging members, such as the engaging members 42, carried by chain 43 may travel. As may be seen in Figure 1, the chain 43 spans a sprocket 44 carried on a shaft 45, and a sprocket 46 carried on a shaft 47. The means for driving this shaft will presently be described.

With a stack of flooring strips in the column, beneath which the chain 44 rotates, each of the engaging members 42 will feed the bottom flooring strip out from the column between the guides 26 and 27 and to hold each block down on the surface of the plate 40 is provided a brush 48, which is carried on a support 49 positioned between the magazine and an adhesive tank 50, which will presently be described. The brush 48 spans all of the spaces between the guides 23 to 27 and consequently will hold down the flooring strips which are fed through the other channels.

In the space between the guides 24 and 25 is a slotted plate 51 similar to the plate 40, and this likewise has a slot 52 which forms a clearance for the engaging members 42a on the chain 43a. A similar slotted plate 53 is provided between the guides 25 and 26, and the slot therein provides clearance for the engaging members 42b carried on the chain 43b, and between the guides 26 and 27 is a fourth slotted plate 54, a slot of which provides clearance for the engaging members 42c carried on a chain 43c. The chains 43a to 43c inclusive are identical with the chain 43 and are carried on sprockets identical with the sprockets 44 and 46 and carried on the same shafts 45 and 47 respectively, so that as the shaft 47 rotates the engaging members on all of the chains simultaneously engage the bottom flooring strip in each column of the magazine and advance them simultaneously through the adhesive stage, to be presently described, and thence to mechanism for performing other operations thereon, as will be more fully explained herein.

Referring now to Figure 3, the slotted plates 40, 51, 53 and 54 have their upper surfaces on a level with the surface 10. Mounted on the upper web of the side channel 13 is a spacer block 22, and mounted on the upper web of the side channel 15 is a spacer block 21. Supported on the spacer blocks 21 and 22 is a horizontal plate 55 which carries the adhesive tank 50. The tank 50 is comprised of a hollow rectangular member having a flange 56 formed about the lower end thereof and this flange is welded or otherwise secured in fluid-tight relation to the plate 55. The tank is provided with a cover plate 57 having a depending rim 58 which forms a snug fit with the upper end of the tank.

The wall 59 of the tank has a rectangular opening 60 formed therein, and horizontally spanning this opening is a shaft 61. The side 62 of the tank also has a rectangular opening formed therein like the rectangular opening 60 and preferably in horizontal alignment therewith. Spanning this opening is a shaft 63. Journaled on the shaft 61 is a walking beam 64 and journaled on the shaft 63 is a like walking beam 65.

Referring to Figure 2, positioned in the tank 50 is a dasher plate 66 which has, in the embodiment shown, six holes 67 formed therein. These holes are in alignment with the bores 32 formed in the guides 24, 25 and 26. The dasher plate 66 has end tabs 68 and 69 which are closely adjacent to the inner surfaces of the end walls of the adhesive tank 50. The dasher plate also has side tabs 70, 71 and 72, 73 which are closely adjacent to the inner surfaces of the side walls of the tank 50. Mounted in the dasher plate 66 is a vertical stud 74 and spaced apart therefrom is a second vertical stud 75.

Referring now to Figure 3, the dasher plate 66 has its vertical stud 74 pivotally connected by means of a clevis pin 76 to a connecting rod 77. The upper end of the connecting rod 77 is pivotally connected by means of a second clevis pin 78 to the inner end of the walking beam 64. The vertical stud 75 in the dasher plate 66 is connected in exactly the same manner and by means of a duplicate connecting rod to the inner end of the walking beam 65.

Depending from the side channel 13 is a bracket member 79, and depending from the channel side 15 is a similar bracket member 80. The bracket member 79 has a clearance hole 81 formed therein and in alignment therewith is a clearance hole 82 in the bracket member 80. Secured on the inner surface of the bracket member 79 is a bearing holder 83, and secured on the inner surface of the bracket 80 is a bearing holder 84. These bearing holders may be provided with any desired type of bearings, for example, a ball or roller bearings. Journaled in the bearings carried in the holes 83 and 84 is a shaft 11. Secured on one end of the shaft 11 is a sprocket 85 which is connected by means of a chain 86 to a smaller sprocket (not shown) carried on a gear reduction unit 87, which gear reduction unit is driven by means of an electric motor 88. Secured on the other end of the shaft 11 is a smaller sprocket 89 which is connected by a chain 90 to a larger sprocket 91, which is secured on the shaft 47. As pointed out above, the shaft 47 carries a series of sprockets 46 which cooperate with corresponding sprockets 44 on the shaft 45 to drive the chains 43 which carry the engagement members 42 for feeding the flooring strips from the magazine 34. An idler sprocket 92 cooperates with the chain 90 to take up the slack.

Secured to the shaft 11 between the sprocket 85 and the bracket 79 is an eccentric 93, and secured to the shaft 11 between the sprocket 89 and the bracket 80 is a second eccentric 94. The eccentrics 93 and 94 are so set on the shaft 11 that their points of maximum throw are in alignment with the axis of the shaft 11. Cooperating with the eccentric 93 is a connecting rod 95 having a bore 96 therein which forms a working fit on the eccentric 93. The wrist pin end 97 of the connecting rod 95 is journaled on a wrist pin member 98 which has a shank extending through a vertical slot 99 formed in the side channel 13. The purpose of this wrist pin will presently be described. A second connecting 100 has a bore 101 which forms a working fit on the eccentric 94. The wrist pin end 102 of this connecting rod is journaled on a wrist pin 103 which has an extension extending through a vertical slot 104 formed in the side channel 15.

Secured on the lower flange of the side channel 13 is a spacer plate 105 and this plate supports a bearing member 106. A similar bearing member 107 is mounted on the plate 55, and in the structure between these bearing members are aligned clearance holes for a reciprocable member 108, which has an enlarged portion 109 to which is secured the extension of the wrist pin 98. The enlarged portion 109 has a stepped threaded portion 110 which extends through a hole in a plate 111, which will be presently described. A suitable nut 112 engages the threads on the member 110, and thus one end of the plate member 111 is secured to the reciprocable member 108. The upper end of the reciprocable member has a threaded hole formed therein which is threadedly engaged by a stud 113, which carries a lock nut 114 so that it may be lengthened or shortened and locked in any desired position by means of the lock nut 114. This stud is pivotally connected to a connecting rod 115 by means of a clevis pin 116 and the other end of the connecting rod is pivotally connected to the outer end of the walking beam 65 by means of a clevis pin 117.

Secured on the lower flange of the side channel 15 is spacer plate 118, and secured to this plate is a bearing member 119. A second bearing member 120 is secured on the plate 55 in alignment with the bearing member 119 and aligned clearance holes are formed in the plate 55, the member 21, the flanges of the side channel 15 and in the spacer plate 118. Mounted in the bearings 119 and 120 is a reciprocal member 121 which is identical with the reciprocable member 108. The member 121 has an enlarged portion 122 to which the extension of the connecting rod 103 is connected. It also has a threaded portion 123, like the portion 110, and this extends through a hole in the other end of the plate 111 and is secured thereto by means of a nut 124 engaging the threads on the portion 123.

The upper end of the member 121 has an internally threaded hole which is engaged by a threaded stud 125 carrying a locking nut 126. The stud 125 is pivotally connected to a connecting rod 127 by means of a clevis pin 128, and in turn the connecting rod 127 is pivotally connected to the outer end of the walking beam 64 by means of a clevis pin 129. All of the connecting rods connect to the walking beams, the dasher plate, and the reciprocable members 108 and 121 are bifurcated on each end, and the clevis pins described are secured in position in these connecting rods by means of cotter pins (not shown).

The plate 111 has a plurality of holes formed therein in alignment with the bores 32 formed in the guides 24, 25 and 26. One of these holes is designated by the numeral 130 in Figures 4 and 5. Mounted in each of these holes is a plunger member 131. Since all of these plunger members are identical, a description of one of them should suffice for all. Each plunger member includes a straight shaft portion 132 having threads 133 formed on one end thereof and threads 134 formed on the other end. Each shaft 132 forms a working fit in a sleeve member 135 which in turn forms a working fit in the bore 32. Threadedly engaging the threads 134 formed on the upper end of the shaft portion 132 is an internally threaded head member 136 having a conical apex 137.

The plunger member 131 has its shaft 132 positively connected to the plate 111 by means of shouldered nuts 138 and 139. The nut 138 engages the threads 133 and has its shoulder 138a extending into the hole 130 from above. The nut 139 has its shoulder 139a extending into the hole 130 from below. The height of the head 136 above the plate 111 may be adjusted by loosening one of the nuts, then securing the other one in a direction to move the shaft 132 upwardly or downwardly, and then when the proper height is obtained the other nut may be tightened to retain the adjustment. Spaced apart from the plate 111 is an intermediate plate 140 to which is secured the sleeve members 135 which, as described above, reciprocate in the bores 32 formed in the guides 24, 25 and 26. Each sleeve member 135 has a head or flange 141 formed integral therewith, and the bore 142 in the intermediate member 140 has a counterbore 143. With the sleeve member 135 positioned in the bore 142 and its head 141 in the counterbore 143, a plate or disc 144 having a clearance hole 145 therein to clear the plunger member 131, spans the head 141, and is secured to the intermediate member 140 by means of screws 146. Each bore 32 in the guide members 24, 25 and 26 is provided with packing means 147 which cooperates with the sleeve member 135 to prevent leakage of the fluid being handled.

A stud 148 has its upper end threadedly engaging the intermediate member 140 and extends downwardly through a clearance hole 149 formed in the plate 111. A second stud 150 is spaced apart from the stud 148 and threadedly engages the intermediate member 140 and extends downwardly through a clearance hole 151 formed in the plate member 111. The stud 148 has an enlarged portion 152, and likewise the stud 150 has an enlarged portion 153. Surrounding the stud 148 and positioned between the plate 111 and the intermediate member 140 is a sleeve 154 which may be formed of rubber or any other like cushioning material, and surrounding the stud 150 and positioned between the plate 111 and the intermediate member is a second cushioning member 155.

When the cushioning members 154 and 155 are positioned between the plate 111 and the intermediate member, the enlarged portions 152 and 153 limit the upward movement of the intermediate member 140 by coming to rest on the lower surface of the plate 111. The stud 148 has a threaded portion 156 which is engaged by a nut 157. Abutting the nut 157 is a cupped washer 158, and between this cupped washer and the plate 111 is a spring 159. The stud 150 has a threaded portion 160 which is engaged by a nut 161. Abutting the nut 161 is a cupped washer 162 and between this cushioned washer and the plate 111 is a spring 163. The tension of the springs 159 and 163 may be adjusted by means of the nuts 157 and 161 respectively.

Secured to the lower surface of the plate by means of bolts 165 is a cylinder 164, which has a cylinder head 166 connected by means of an array of pipe fittings 167 to a T 168 which is in turn connected to a controlled source of a fluid medium under pressure (such as compressed air).

Within the cylinder 164 is a piston 169 having a piston rod 170 connected thereto and movable therewith. The upper end of the piston rod 170 is threaded and it extends through a clearance hole 171 formed in the intermediate member 140 and is secured thereto by means of nuts 172 and 173.

A second cylinder 174 is secured to the underside of the plate 111 by means of bolts 175. This cylinder has a cylinder head 176 which is connected by an array 177 of pipe fittings to the T 168. This cylinder is spaced apart from the cylinder 164. It carries a piston (not shown) like the piston 169 which has a piston rod 178, the upper end of which is threaded and extends through a clearance hole 179 in the intermediate member 140. Engaging the threads is a nut 180 below the intermediate member 140 and a nut 181 above the intermediate member. By means of nuts 172 and 173, and the nuts 180 and 181, the piston rods 170 and 178 may be adjusted.

Referring to Figures 2, 4 and 5, guide springs 182, 183, 184, 185 are mounted on the guides 27, 26, 25 and 24 respectively. Each of these springs includes a lug which is secured on the upper surface of its guide strip and includes a spring portion which depends from this lug and lies adjacent to its guide member. For example, in Figures 4 and 5 the guide spring 184 is seen, and it will be noted that the main body of this spring lies adjacent to the guide 25 and which engages the tongue of the flooring strip 188 to the left. Likewise the spring 183 on the guide 2t urges the flooring strip 187 to the left so that its grooved edge bears against the guide 25. This insures that the nozzles, such as the nozzle 30, project into the groove and have their exits positioned for squirting the little jets of rubber against the bottom of the groove.

*Action of the nozzle impulses*

Referring to Figures 4, 5 and 6, and keeping in mind Figure 3, the walking beams are swung upwardly by the connecting rods 95 and 100 which reciprocate the members 108 and 121. As these members reciprocate, the plate 111 is moved therewith and also the plunger members 131 within the sleeve members 135. As the plate 111 is moved upwardly by the members 108 and 121 the walking beam 65 is moved in a clockwise direction about its axis 63, and the walking beam 64 is moved in a counterclockwise direction about its axis 61. As a result of this movement, due to the connecting rods one of which is shown at 77, the dasher plate 66 is moved downwardly to the position shown in Figure 3, which is the position which may be best seen in Figure 5. The plunger member has by that time moved upwardly so that the head 136 thereof is substantially above the conical hole 55a formed in the plate 55. During this time the plate 140 is moved in time with the plate 111 and consequently the distance between the head 136 and the upper end of the sleeve 135 remains fixed.

From the position shown in Figure 5 the plate 111 and the intermediate plate 140 are moved downwardly, and as the head 136 recedes into the bore 32 there is trapped between the lower end of the sleeve 135 a body 190 of the rubber adhesive. By the time the trapped body of adhesive 190 is substantially centralized with respect to the nozzle 30, air is suddenly supplied to the cylinders 164 and 174 via the T 168 (this is controlled by cam means to be presently described), thereby causing the sleeve 135 to suddenly move upwardly. This causes some of the adhesive to squirt through the nozzle aperture 31 and impinge upon the bottom of the groove in the form of a spot 33. The supply of air is then immediately cut off from the cylinders 164 and 174. During the time the plate 140 is moved upwardly by the cylinders 164 and 174 rubber cushioning members 154 and 155 have been moved out of contact with the plate 111, and at the same time the springs 159 and 163 were tensioned so that as soon as the supply of air was cut off from the cylinders 164 and 147, the reaction of these springs causes the intermediate plate 140 to move downwardly with a snap and to come to rest with a cushioning effect when the cushioning members 154 and 155 are again brought into contact with the plate 111 due to this movement. This causes the space in which the isolated body of adhesive 190 is contained to suddenly become greater, with the result that any of the adhesive in the nozzle passage is withdrawn into the space between the head 136 and the upper end of the sleeve instead of being allowed to ooze out and to dribble onto the flooring strips.

It has been found that as the head 136 and the sleeve 135 are reciprocated in the bores 32 there is no tendency for the adhesive to discharge from the nozzles until the relative relation of the sleeve and the head is changed, and due to this propery we very conveniently and effectively cause this change by delivering compressed air to the cylinders 164 and 174 just at the right time and for a sufficiently short duration to deposit, quite exactly, the necessary quantities of adhesive in each spot to form what might be termed "hinging" parquet flooring blocks. Due to the fact that we suddenly withdraw into the space between the head and the upper end of the sleeve the adhesive contained in the nozzle passage 31, the adhesive spots are confined entirely to the bodies of the grooves and to the surfaces of the tongues which are subsequently placed in contact therewith.

Referring now to Figures 1 and 2, a carriage 191 includes end plates 192 and 193 which are secured together by tie rods 194 and 195 constituting one group, and tie rods 196 and 197 constituting another group. The end plate 192 has flanged rollers 198 and 199 mounted thereon, and likewise the end plate 193 has flanged rollers 200 and 201 mounted thereon. These rollers bears on the upper surface 10 of the plate 9 and the flanges engage the edges of the plate and are guided thereby. The carriage 191 has a depending lug 202 which carries a boss 203. A piston rod 204 is pivotally connected to the depending lug 202. The piston rod has a piston which is reciprocable in a cylinder 205, and the cylinder 205 is connected by means of a flexible conduit 206 to a cam controlled valve, which will presently be described.

The depending lug 202 also has pivotally connected to it a piston rod 207 having a piston reciprocably carried in a cylinder 208, and this cylinder is connected by means of a flexible conduit 209 to a cam controlled valve, which will also presently be described. The table or support carries stops 210 and 211 which are spaced apart from each other and which define the extremes of the path of travel of the carriage. For example, when the cylinder 205 is supplied with air its piston through the medium of the piston rod 204 and the depending lug 202 moves the carriage to the left, as seen in Figure 1, until the boss 203 comes in contact therewith and is arrested by the stop 211. When the carriage is being moved to the right by the cylinder 208 the boss 203 is arrested by the stop 210.

Referring now to Figure 2, a plate 212 has spaced bosses 213 and 214 thereon which form working fits on the tie rods. The plate 212 extends downwardly and just clears the surface 10 of the plate 9. The plate 212 has secured thereto a piston rod 215 which carries a piston adapted to reciprocate in an air cylinder 216. The cylinder 216 has a flexible conduit 217 which in turn in connected to valve means to be presently described.

A plate 218, which is identical with the plate 212, carries bosses which form working fits on the tie rods 193 and 194, and this plate has connected thereto a piston rod 219 which carries a piston reciprocally carried in a cylinder 220. A flexible conduit, not shown, like the conduit 217 is connected to the same source of compressed air as the conduit 217, as will hereinafter be described.

A plate 221 is similar to the plate 212 and is provided with bosses having holes therein which form working fits on the tie rods 196 and 197. The plate 221 has a piston rod 222 connected thereto and this rod carries a piston which reciprocates in a cylinder 223. A flexible conduit 224 is connected to the cylinder 223 and has its other end connected to a cam controlled valve, which will presently be described. A plate 225 has spaced bosses thereon which are bored out to form working fits on the tie rods 196 and 197, and this plate has a piston rod 226 connected thereto and this rod in turn carries a piston adapted to reciprocate in a cylinder 227. The cylinder 227 is supplied with compressed air in time with and from the same source as the air supplied to the cylinder 223 so that as the several flooring strips with the spots of rubber deposited in the grooves thereof leave the feeding mechanism and the guide strips 23 to 27, they arrive on the surface 10 and between the depending portions of the plates 221 and 225 and at that time (as will hereinafter be described) air is supplied to both the cylinders 223 and 227, thereby causing the several flooring strips to be brought together under comparatively light pressure. Then as soon as the air in the cylinders 223 and 227 is released the lightly assembled parquet block, formed of the several flooring strips, is released and delivered between the depending portions of the plates 212 and 218, as will hereinafter be described.

The shaft 11 carries a cam 228 which has secured thereto a lobe 229 which actuates valves 230 and 231 simultaneously. The valve 230 is connected to a source of air under pressure and to the flexible conduit 224 which supplies the cylinder 223, and also to the conduit which supplies the cylinder 227. The valve 231 is connected to a source of air under pressure which may be a higher pressure than the source to which the valve 230 is connected, and this valve in turn is connected to the conduit 217 which supplies air to the cylinders 216 and 220.

The shaft 11 carries a cam 232 which has a lobe 233 for actuating the valve 234. The T 163 has a street L 235 connected thereto and leading from the street L to the valve 234 is a flexible conduit 236, so that each time the cam 232 actuates the valve 234 compressed air is supplied to the cylinders 264 and 174.

The shaft 11 carries a cam 237 which controls a valve 238, which is connected to the other end of the flexible conduit 206 leading to the cylinder 205. A second cam 239 is mounted on the shaft 11 and it controls a valve 240 which is connected to the other end of the flexible conduit 209 for delivering air to the cylinder 208. Thus the movement of the carriage between the stops 210 and 211 is controlled.

The shaft 11 also carries a cam 241 which controls a valve 242. This valve is connected to a cylinder which raises and lowers a series of pins 244 vertically. The extreme limit of movement of these pins vertically is substantially the thickness of each of the flooring strips, and the function of these pins is to move into contact with the lower surfaces of the flooring strips in the next to the bottom row in the hopper 34 after the lugs 42 on the chains 43 have started feeding the bottom layer of the flooring strips from the magazine. This holds the stack of strips in the magazine horizontally even though the bottom row is being fed outwardly and the cam 241 so times the supply of air to the cylinder controlling the pins 244 so that as the trailing ends of the strips being fed out of the magazine leave the stack, the pins 244 are released so that all of the stacks in the magazine are allowed to move downwardly substantially level.

The valves 230, 231, 234, 238, 240 and 242 are supported on an inverted generally U-shaped support 243 which is in turn secured to the longitudinal frame members one of which is shown at 20.

Several air tanks, at least some of which are shown at 245, 246 and 247, are connected to a source of compressed air and these may include pressure reducing valves, not shown, which maintain several pressures in the several tanks which are indicated by the gages 248, 249 and 250, respectively.

Referring to Figure 2, the flooring strips 186 to 189, inclusive, after having had the rubber spots deposited in the groove thereof, move between the clamping members 221 and 225 where they are forced lightly together by the cylinders 223 and 227. This occurs when the cylinder 208 is supplied with air and the carriage 191 is moved to the right, as seen in Figure 2, to its extreme position with the boss 203 in contact with the stop 210. While the blocks between the members 221 and 225 are held together under this light pressure the carriage 191 is advanced to the left due to the fact that the cam 239 cuts off the supply of air to the cylinder 208 and the cam 237 supplies air to the cylinder 205, and thereby the carriage is moved to its extreme left position with the boss 203 in contact with he stop 211. This brings the assembled parquet block formed of the strips 186a, 187a, 188a and 189a to the position shown in solid lines at 251 in Figure 2. Then the air to the cylinders 223 and 227 is released, allowing the members 221 and 225 to move to their extreme outer positions. At the same time air is removed from the cylinders 216 and 220, allowing the clamping members 212 and 218 to also move to their extreme outer positions. Following this the supply of air to the cylinder 205 is cut off and air is again supplied to the cylinder 208 and the carriage 191 is moved to its extreme right position. Following this the next set of flooring slats with the rubber deposited in the bottoms of the grooves is moved to positions between the clamping members 221 and 225 and air is supplied to the cylinders 223 and 227, and simultaneously air is supplied to the cylinders 216 and 220 with the result that the set of strips between the clamping members 221 and 225 are lightly clamped together and the group in the position 251, which previously had been lightly clamped together, are more heavily clamped together between the clamping members 212 and 218.

During the next machine cycle the group of flooring strips between the clamping members 221 and 225 are moved to the left to the position 251 and the block which was between the clamping members 212 and 218 is thereby moved to the left.

It is to be understood that the above detailed description of the present invention and the modificaion thereof is intended to disclose embodiments thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of he following claims beyond the requirements of the prior art.

What is claimed is:

1. In a machine for applying spots of adhesive in the bottoms of grooves in flooring strips, a table, means to feed said strips in a substantially straight path along the surface of said table, a tank positioned above said path and adapted to contain adhesive, nozzle means including fixed nozzles extending into said path to be traversed by grooves in said strips as the latter are fed along said path, pulsing means between the adhesive in said tank and passages in said nozzle means for momentarily supplying adhesive to said passages under pressure and for immediately reducing said pressure to subatmospheric, thereby causing a drop of adhesive from each nozzle to discharge and impinge upon the bottom of said groove and causing the adhesive remaining in the passages to be immediately withdrawn therefrom so as to prevent adhesive from getting on to other portions of the surfaces of said strips.

2. In a machine for applying spots of adhesive in the bottoms of grooves in flooring strips, a table, means on said table defining a path along the surface thereof, means for feeding said strips along said path with the grooves therein laterally disposed, a tank positioned above said path and adapted to contain adhesive, nozzle means extending laterally in said path and into the grooves of said strips, said nozzles having discharge ends facing the bottoms of said grooves as the strips are fed along said path, positively actuated pulsing means between the adhesive in said tank and passages in said nozzle means for momentarily supplying adhesive to said passages under pressure and immediately reducing said pressure to sub-atmospheric, thereby causing a drop of adhesive from each nozzle to discharge therefrom and impinge upon the bottom of the groove facing it and causing the adhesive remaining in said passages to be immediately withdrawn therefrom, thereby preventing adhesive from oozing from said passages after each discharge.

3. The invention according to claim 2, in which said pulsing means includes a plunger reciprocally carried in a sleeve which in turn is reciprocally carried in a cylinder bore communicating with one of said nozzles and with the interior of said tank; a head carried on the upper end of said plunger and adapted to place the space in said bore, between said head and the end of said sleeve, into communication with the interior of said tank during one portion of an operating cycle; and adapted to isolate said space therefrom during other portions of said cycle, reciprocable means for moving said plunger and said sleeve in unison during a portion of said operating cycle, other means acting independently of said first means for moving said sleeve and said head nearer together to effect a sudden discharge of adhesive from the nozzle, said other means being adapted to cease acting as said discharge is effected, and spring means for reestablishing the relation of the sleeve with said plunger as said last means ceases to act.

4. The invention according to claim 2, in which said pulsing means includes a plunger reciprocally carried in a sleeve which in turn is reciprocally carried in a cylinder bore communicating with one of said nozzles and with the interior of said tank; a head carried on the upper end of said plunger and adapted to place space in said bore, between it and the end of said sleeve, into communication with the interior of said tank so that said space may receive adhesive during one portion of an operating cycle; and adapted to isolate said space from said tank during other portions of said cycle, eccentric means for moving said plunger and said sleeve in unison during the major portion of said operating cycle, air controlled piston means acting independently of said first means for moving said sleeve toward said head and reducing the volume of said space to effect a sudden discharge of adhesive from said nozzle, said piston means being adapted to cease acting as said discharge is effected, and spring means acting with a snap for reestablishing the relation of the sleeve with said plunger as said piston means ceases to act.

5. In a machine for applying spots of adhesive in the bottom of grooves in flooring strips, a table, guide means on said table defining a path along the surface thereof, means to feed said strips along said path with its upper surface uppermost and with grooves therein facing laterally, a tank positioned above said path and adapted to contain adhesive, nozzle means supported in said guide means below the level of and having a discharge end extending horizontally into said path and consequently into the groove of the strip traversing said path, a dasher plate in said tank, pulsing means between the adhesive in said tank and passages in said nozzle means, means operating said dasher means and said pulsing means in timed relation to each other for momentarily supplying adhesive to said passages under pressure and immediately reducing the pressure to sub-atmospheric, thereby causing adhesive from said nozzle means to discharge therefrom and impinge upon the bottom of the groove facing it and for causing the adhesive remaining in said passages to be immediately withdrawn therefrom.

6. In a device of the character described, a tank for adhesive, a cylinder having a bore therein, one end of which is adapted to communicate with adhesive in said tank, a sleeve reciprocally carried in said cylinder, a plunger reciprocally carried in said sleeve and having a head thereon of a diameter to form a working fit in said cylinder, a nozzle extending laterally from the wall of said cylinder and having a passage communicating with the interior of said cylinder, and means to move said sleeve and said plunger differentially to effect a sudden discharge from said nozzle and to immediately cause any remaining adhesive in said nozzle to withdraw into said cylinder.

7. In a device of the character described, a tank for adhesive, a cylinder having a bore therein, one end of which is adapted to communicate with the bottom of said tank, a sleeve reciprocally carried in said cylinder, a plunger reciprocally carried in said sleeve and having a head thereon of a diameter to form a working fit in said cylinder, the space between said head and the adjacent end of said sleeve being adapted to receive adhesive, a nozzle extending laterally from the wall of said cylinder and having a passage therein communicating with the interior of said cylinder, and means to move said sleeve and said plunger differentially to effect a sudden discharge of adhesive from said nozzle and to immediately withdraw remaining adhesive in said nozzle into said cylinder.

8. In a device of the character described, a tank for adhesive, a cylinder mounted on the bottom wall of said tank and having a bore therein extending through said bottom wall, a sleeve reciprocally carried in said cylinder, a plunger reciprocally carried in said sleeve and having a head thereon, the diameter of which is substantially equal to the diameter of said sleeve, a nozzle extending laterally from the wall of said cylinder and having a passage therein communicating with the interior of said cylinder, means to move said sleeve and said plunger differentially to effect a sudden discharge of adhesive from said nozzle, and spring means acting immediately upon the cessation of the action of said last means to suddenly withdraw remaining adhesive in said nozzle into said cylinder.

9. A device according to claim 8 in which the reciprocating paths of said sleeve and said head are partially in said cylinder and partially in said tank.

ARTHUR KLAMMT.
GEORGE W. KRETZSCHMAR.

References Cited in the file of this patent

UNITED STATES PATENTS

| Number | Name | Date |
|--------|------|------|
| 541,103 | Mabin et al. | June 18, 1895 |
| 1,010,594 | Cowles | Dec. 5, 1911 |
| 1,230,379 | Clas | June 19, 1917 |
| 2,135,755 | Laushe | Nov. 8, 1938 |
| 2,252,432 | Klammt | Aug. 12, 1941 |